United States Patent [19]
Neft

[11] 4,270,588
[45] Jun. 2, 1981

[54] MITER SAW ATTACHMENT
[76] Inventor: Charles H. Neft, 3432 Emerson Ave. S., Minneapolis, Minn. 55408
[21] Appl. No.: 45,968
[22] Filed: Jun. 6, 1979
[51] Int. Cl.³ .......................................... B27B 21/00
[52] U.S. Cl. ............................... 145/35 R; 145/31 R; 145/32 R; 145/33 R
[58] Field of Search ................. 145/35 R, 35 E, 31 R, 145/31 AB, 31 AC, 31 AD, 31 AE, 32 R, 33 R

[56] References Cited
U.S. PATENT DOCUMENTS

| | | | |
|---|---|---|---|
| 549,167 | 11/1895 | Swenson | 145/32 R |
| 774,039 | 11/1904 | Carpenter | 145/31 AB |
| 1,388,014 | 8/1921 | Alguier | 145/31 AB |
| 2,070,735 | 2/1937 | Jacques | 145/32 R |
| 2,375,651 | 5/1945 | Henry | 145/33 R |
| 2,403,027 | 7/1946 | Shoultz | 145/31 R |
| 2,682,286 | 6/1954 | Barker | 145/33 R |
| 2,727,545 | 12/1955 | Dawson | 145/31 R |

FOREIGN PATENT DOCUMENTS

| | | | |
|---|---|---|---|
| 608876 | 2/1935 | Fed. Rep. of Germany | 145/31 R |
| 316224 | 11/1956 | Switzerland | 145/32 R |

Primary Examiner—Othell M. Simpson
Assistant Examiner—J. T. Zatarga
Attorney, Agent, or Firm—James R. Cwayna

[57] ABSTRACT

An attachment for use with miter box or other blade guided saws including a rigid frame member with upstanding links for connection of the frame to the blade portion of the guided saw and having downwardly directed links for receiving and holding a selected, second blade such that the second blade may be guided in the same manner and with the same structure that is used to guide the main or first blade. The normally provided handle of the guided saw may be utilized or a handle may be provided on the rigid frame.

4 Claims, 7 Drawing Figures

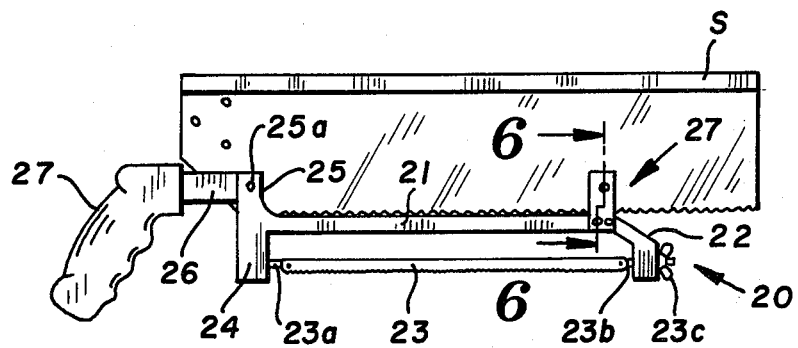
FIG. 5
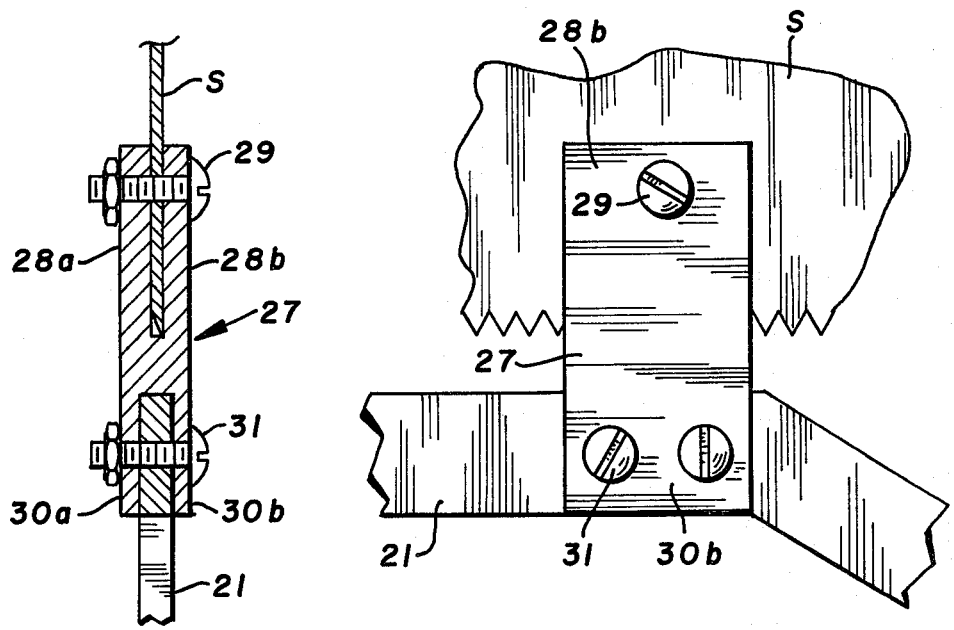
FIG. 6
FIG. 7

MITER SAW ATTACHMENT

FIELD OF THE INVENTION

This invention relates generally to cutting tools such as miter box saw units and more specifically to an attachment device attachable to the blade of the guided saw for holding a second blade such as a hack saw blade such that the same is also guided during the cutting of materials.

BACKGROUND AND OBJECTS OF THE INVENTION

The use of miter boxes and the accompanying saw is well known in the wood working field and as is known, the miter box unit provides a unit which will accurately cut pieces of wood to a desired angle. The saw used in connection with a miter box is particularly rigid and is normally carried in spaced guides on either side of the miter box with the wood to be cut arranged and positioned therebetween.

Very often it is required to cut other materials such as aluminum, steel and other metals and other non-wood products with this same degree of accuracy and preferred angles. The saw provided with a miter box is not designed for such cutting and therefore the applicant has provided an attachment device which is easily attached to the blade of a miter box saw and which is designed to carry a second blade such as a hack saw blade to accomodate such cutting tasks.

The prior art discloses certain aspects and structures for mounting and holding hack saw blades and other blades to guided saw elements and this art includes the U.S. Pat. Nos. to Zimmerman, 3,881,386; Dawson, 2,727,545; McManus, 3,825,047 and Knuth, 4,043,367. Applicant's device provides improvements and substantial structural differences over each and all of these prior art references. Of a primary difference in a comparison of the applicant's device is the simplicity of attachment and removal of his unit to and from the miter saw blade. The rigid frame arrangement which permits proper tensioning of the hack saw or second blade is also of importance to proper use of such a blade and further, applicant's device requires no special modifications of the existing miter saw and box unit other than requiring, in one form of the invention that the miter saw blade be provided with apertures for the mounting of the rigid frame portion thereto.

It is therefore an object of applicant's invention to provide a miter saw attachment including a rigid frame member arranged for attachment to the blade of a miter saw and which frame is designed and arranged to properly carry a second cutting blade.

It is a further object of applicant's invention to provide a miter saw attachment for carrying a second, selected blade in cutting position below the miter saw blade as the same is used in a miter box.

It is yet a further object to provide an attachment for the blade of a miter saw to permit the mounting of a second cutting blade thereto, the attachment including a rigid frame adapted to properly hold a second cutting blade and which frame provides means for properly tensioning the second blade for guiding by the miter saw blade.

These and other objects and advantages of applicant's invention will more fully appear from the following description made in conjunction with the accompanying drawings in which the same numeral or indicia is used to designate the same or similar parts throughout the several views, and in which:

FIG. 1 is a perspective view of miter box and miter saw to which the attachment device embodying the concepts of applicant's invention have been attached and illustrating the same in position to cut a length of piping or the like;

FIG. 5 is a side elevation of a modified form of the invention wherein a handle is provided on the attachment frame of applicant's device;

FIG. 6 is a vertical section taken substantially along Line 6—6 of FIG. 5 and being drawn to an enlarged scale; and, FIG. 7 is a side elevation taken from FIG. 6.

In accordance with the accompanying drawings, a first form of applicant's invention illustrating the device simply attached to the miter saw blade for movement through the handle thereof is generally designated 10 with the miter saw being designated S and the miter box unit being designated B and the handle of the saw S being designated H.

Figure 1:
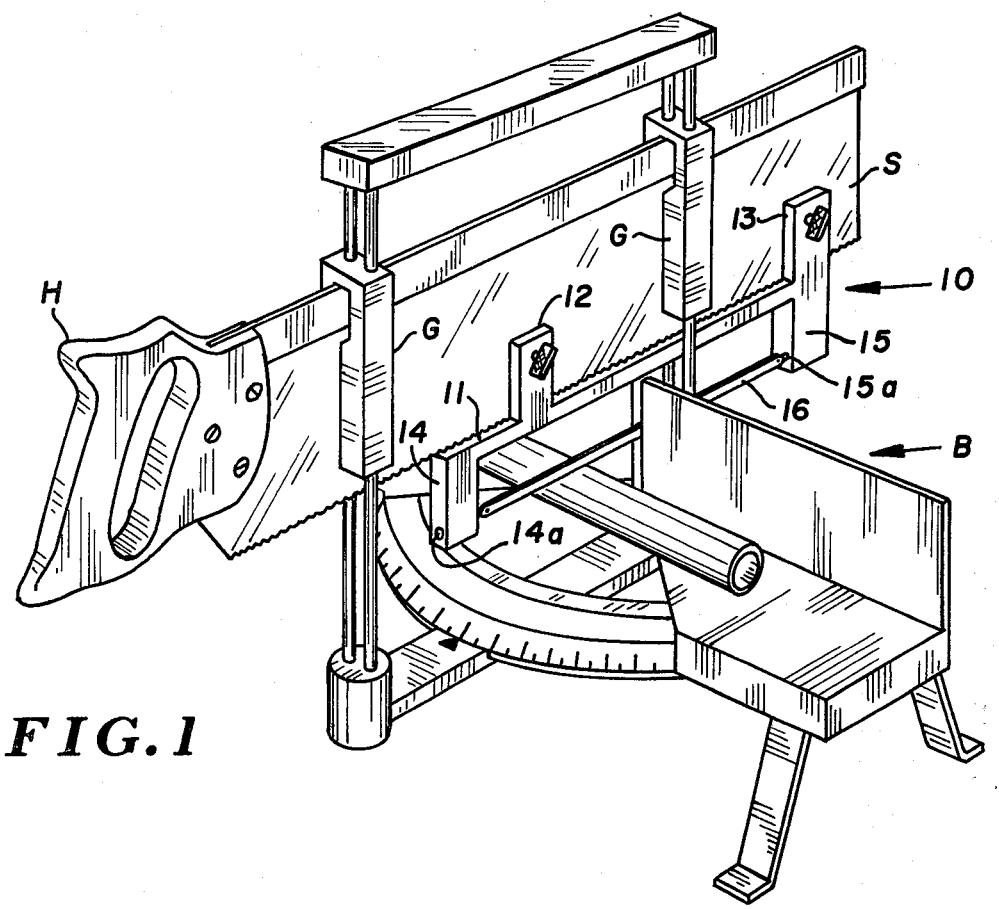
Figure 2:
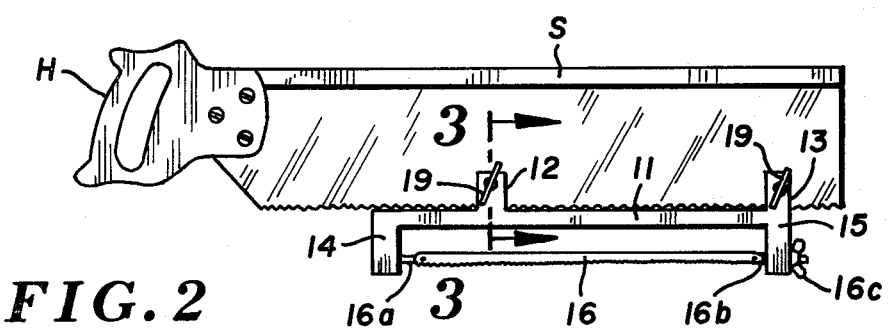
FIG. 2 is a side elevation of a miter saw having a first form of the applicant's attachment device mounted thereon.
Figure 3:
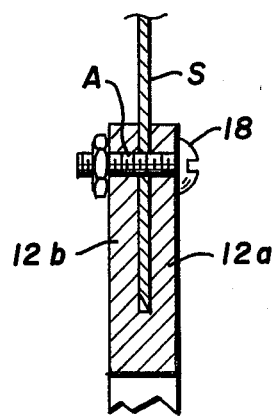
FIG. 3 is a vertical section taken substantially along Line 3—3 of FIG. 2 illustrating a first form for attachment between the miter saw blade and applicant's device.
Figure 4:
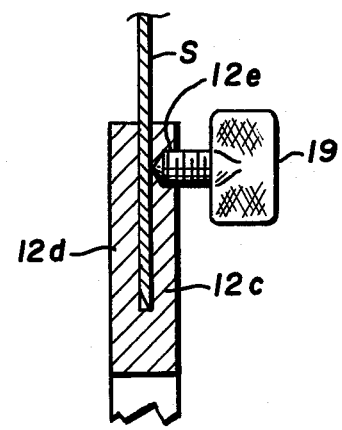
FIG. 4 is a view similar to that of FIG. 3 and illustrating a second form for attachment of applicant's device to the miter saw blade.

In this particular form which further encompasses FIGS. 2, 3 and 4, the attachment device 10 includes a longitudinally extending frame member 11 having a pair of spaced apart, bifurcated attachment ears or links 12, 13 extending upwardly from the upper surface thereof and further including a pair of downwardly extending blade mounting legs 14, 15. The spacing between the upper links 12, 13 is selected to provide a rigid attachment feature for securing the unit 10 to the blade of the saw S and permitting sufficient movement thereof for proper cutting. As illustrated in FIG. 1, the miter box unit B is provided with vertical guides G and the saw is moved transversely of the box unit B to effect the cutting and the spacing between these upper links 12, 13 is selected to permit a sufficient cutting stroke.

The spacing between the downwardly extending the blade mounting legs 14, 15 is selected for mounting a range of lengths of second blades 16 therein and with those skilled in the art, it should be obvious that this type of mounting allows a hack saw or other selected blade to be inserted between such legs and properly tensioned therebetween.

A first form for attaching the unit 10 to the blade S is illustrated in the cross section of FIG. 3. As illustrated therein, the saw blade S must be provided with an aperture A to receive a connective element 18 such a bolt and nut combination therethrough such that the bifurcated legs 12a, 12b may be clamped about the saw blade S.

A second form of attachment is illustrated in FIG. 4 and in this instance and drawing, the bifurcated legs of link 12 are designated 12c, 12d and leg 12c is illustrated as having a threaded aperture therethrough, such aperture being designated 12e such that a holding element as the pointed thumbscrew 19 may be received therein and impinge upon the surface of the saw blade S to similarly secure the unit 10 to the saw blade S.

It should be obvious that either form of this attachment could be utilized without departing from the scope of the invention.

The means for securing the blade 16 to the downwardly extending legs 14, 15 will be well understood by any having used a hack saw blade. A passage is provided in leg 14, designated 14a to receive a blade anchoring member 16a and a passage 15a is provided in leg 15 to receive a second, threaded anchoring member 16b therethrough and a wing nut 16c or the like is provided to act against leg 15 and provide tensioning for the blade 16.

Obviously, the described rigid frame mounting provides a unit to positively hold the second blade 16 directly in line with the guided miter saw blade S to provide a controlled cut.

A modified form of the invention is illustrated in FIG. 5, 6 and 7. In this form of the invention the handle H has been removed from the miter saw blade S but it should be obvious that this is simply an illustration to show that the frame unit may be provided with its own handle and that the unit may be separated from the miter box saw blade and be used independently.

In this form of the invention, the entire unit is designated 20 and includes a longitudinally extending frame member 21 having a first, outward, downwardly depending end 22 to receive and hold one end of the second blade 23, a second, downwardly depending end 24 to receive and retain the other end of said blade and upwardly directed links to mount the entire unit 20 onto the miter saw blade S.

In the form shown, a first upwardly extend-link 25 is positioned substantially, directly in alignment with the second depending end 24 and an angularly arm 26 is affixed thereto which a handle member 27 is attached. As illustrated, an aperture is provided through the first upwardly extending link 25 at the joinder of the arm 26 and this structure provides a bifurcated unit to receive the saw blade S therebetween with a connective element such as is illustrated in FIG. 3 or 4 to secure the same to the blade S.

In order to hold the second cutting blade between the downwardly directed ends, the same structure as previously discussed in the description of FIG. 3 may be utilized. In this form then, passages must be provided in the ends 22, 24 and the connective elements 23a, 23b, including the wing nut 23c are provided for proper tensioning of the blade 23.

To permit and to provide for the use of the unit 20 as an individual saw or cutting element, the applicant has provided an attachment end 27 for use with the unit in a position to support the outwardly directed end of the same and therefore in close proximity to the downwardly depending end 22 of the frame unit 20. This particular unit 27 is best illustrated in the cross section of FIG. 6. In the form illustrated, the unit 27 includes a bifurcated arm section having arms 28a, 28b, each having passages therethrough to receive a connective element 29 therethrough. Obviously, the spacing between such arms 28a, 28b provides an area to receive the saw blade S therebetween and a passage must be provided through blade S for such connective element.

The depending portions of such mounting unit also provide a bifurcated arm structure, designated 30a, 30b, having apertures therethrough for, in the form shown, a pair of connective elements 31 to pass therethrough and clamp the elongated frame portion 21 therebetween.

This mounting unit 27 may then be easily removed from the saw blade S and the frame portion 21 such that the same may be used as an individual sawing unit.

With this modified form of the invention, the unit has been illustrated with the handle H of the miter saw being removed. Depending upon the position of this particular handle, the applicant has found that it is not always necessary to remove this handle H.

With the device as illustrated herein, it should be obvious that the applicant has provided a unique mounting frame for attachment to a guiding saw member with the frame being useable with the guiding saw member as a unit and also a frame arranged for carrying a sawing blade which may function as a cutting tool without requiring attachment to the guiding member.

What I claim is:

1. An attachment device for attaching a second cutting blade to a miter saw, said attachment device including:
   a. a longitudinally extending frame member;
   b. a pair of spaced apart, upstanding link members arranged on the respective ends of said frame member, each of said link members including a pair of bifurcated arms to receive the blade of the miter saw therebetween;
   c. means for clamping said bifurcated arms to the blade of the miter saw to positively hold the frame member directly therebelow;
   d. a pair of downwardly directed leg members arranged on said frame member; and,
   e. means for attaching the second cutting blade between said leg members such that the same is positioned directly below and in alignment with the blade of the miter saw.

2. The structure set forth in claim 1 and means for tensioning the second cutting blade between said leg members.

3. The structure set forth in claim 1 and handle means arranged on a selected end of said longitudinally extending frame member.

4. The structure set forth in claim 1 wherein one of said upstanding link members is removably secured to said longitudinally extending frame.

* * * * *